United States Patent Office 3,408,896
Patented Nov. 5, 1968

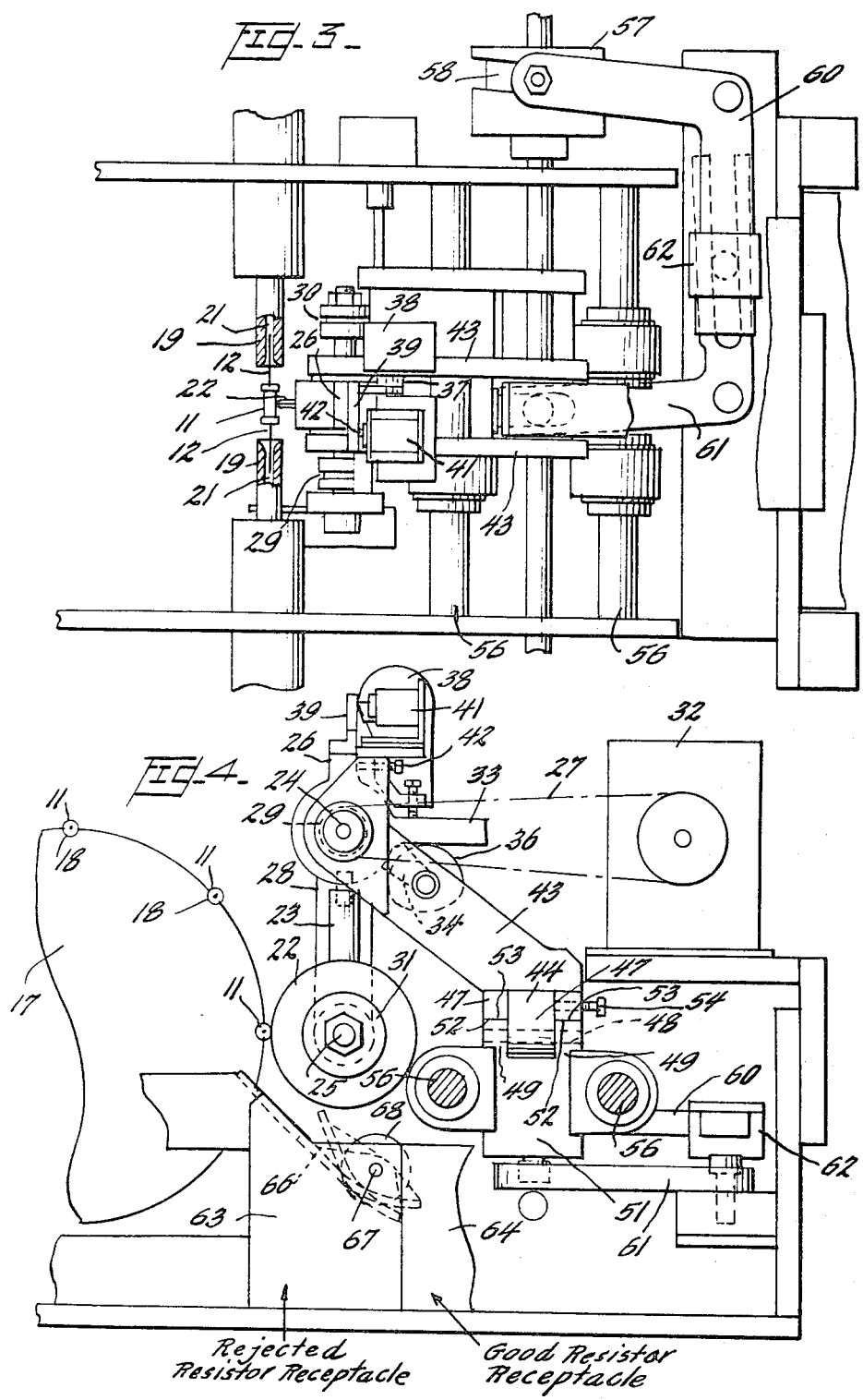

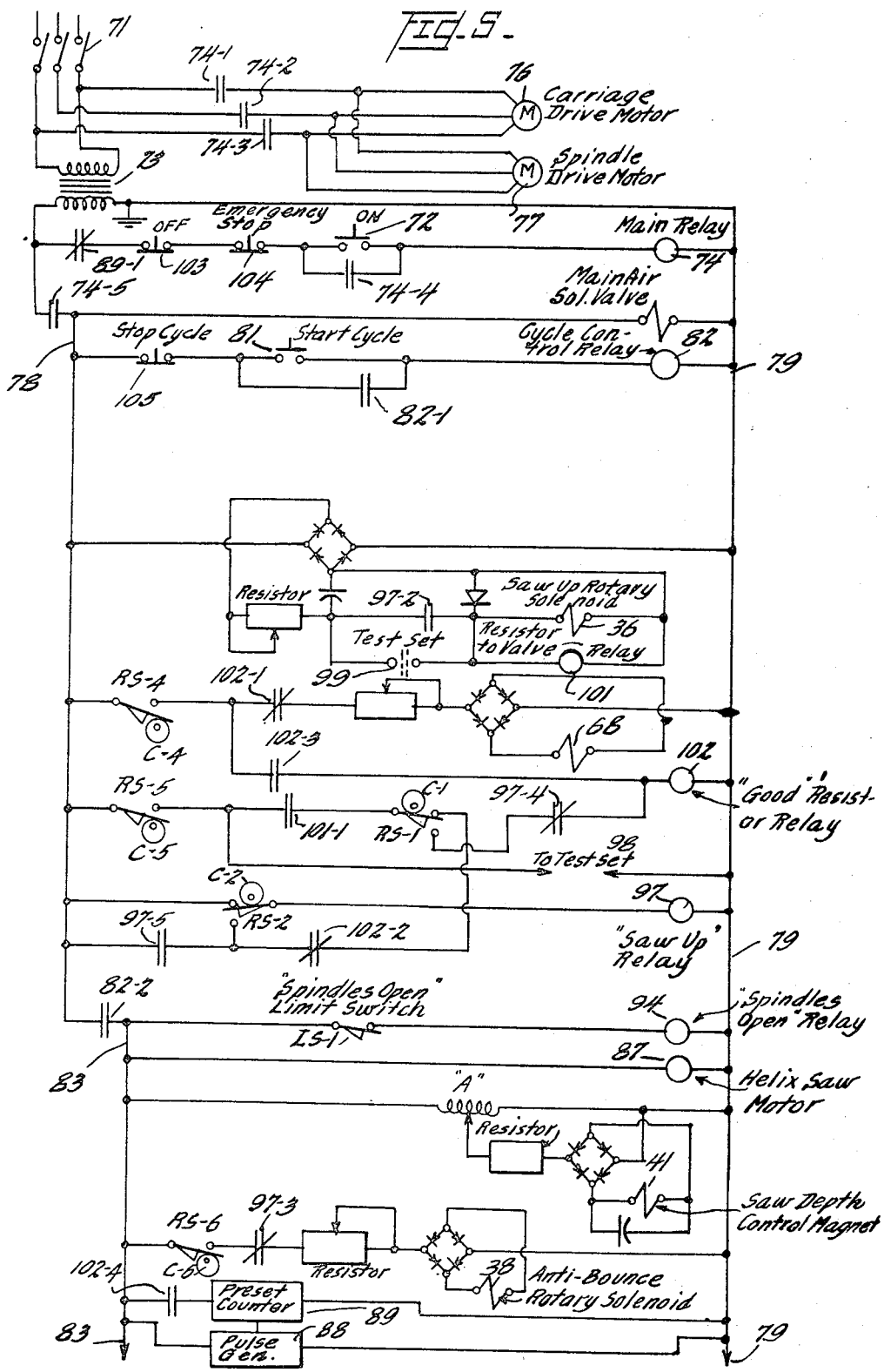

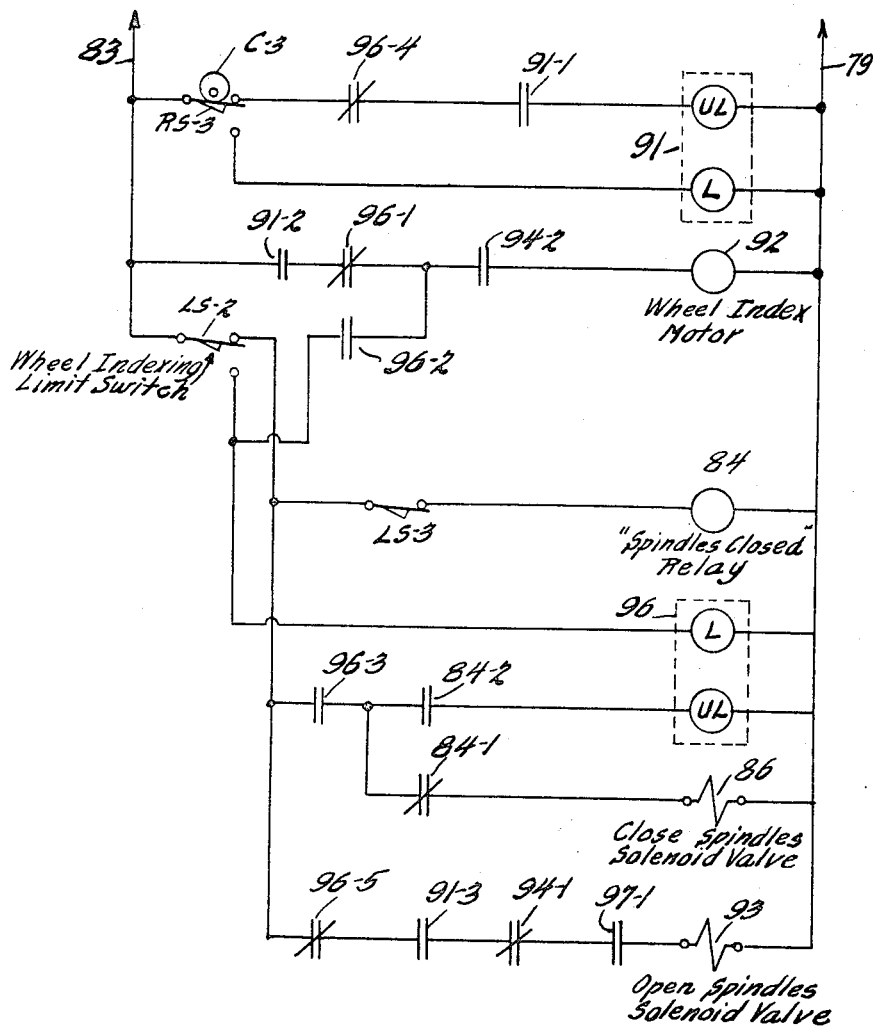

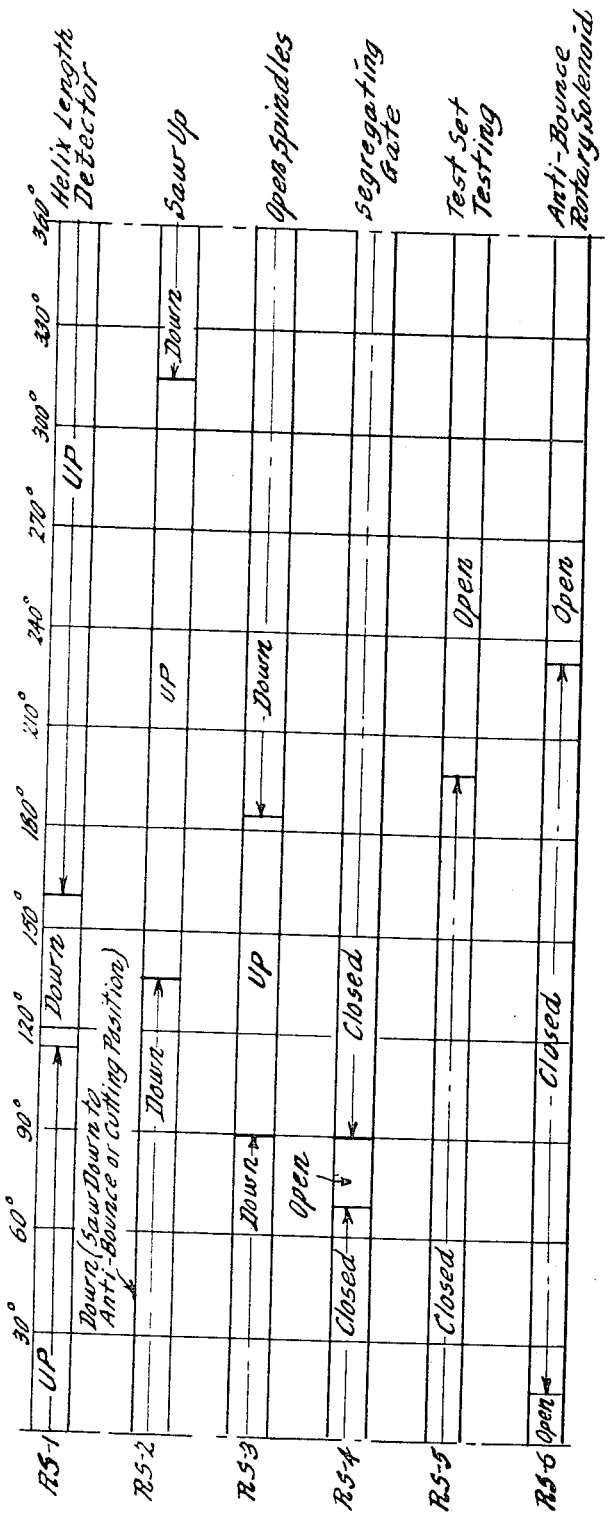

3,408,896
APPARATUS FOR HELIXING A PATH IN A CARBON FILM DEPOSITED ON A CERAMIC CORE
Nicholas J. Mandonas, Medford, and Alphonse J. Sevigny, Jr., Amesbury, Mass., assignors to Western Electric Company, Incorporated, New York, N.Y., a corporation of New York
Filed May 20, 1966, Ser. No. 551,598
10 Claims. (Cl. 90—11.64)

ABSTRACT OF THE DISCLOSURE

Apparatus uses a pivotally mounted rotary saw to make helical cuts in films on ceramic cores. The saw pivots downwardly into an intermediate position, close to a core, then drops onto the core without rebounding therefrom, as portions of two cams are removed successively from support of the saw. A magnet holds the saw at a desired depth of cut. The saw is mounted for adjustment to follow a desired angle of helix. Preliminary and continuous resistance tests govern the cutting of each helix to bring the film resistance to a desired value.

---

This invention relates to apparatus for helixing a path in a carbon film deposited on a ceramic core, and more particularly to apparatus of this type having facilities for bringing a rotating saw into cutting contact with the core with a minimized tendency of the saw to rebound from the core, for holding the saw against the core with a substantially constant depth of cut and for tilting the saw to parallel the helical path to be cut by the saw into the carbon film on the core.

In helixing resistor blanks to value by cutting a helical groove in a carbon film deposited on a ceramic core of each resistor, using a rotating cutting saw mounted with a pendulum-type suspension, there is a tendency for the saw to rebound from the core upon being brought into contact with the core. Such rebound, occurring during traverse of the saw along the length of a rotating core, causes the saw to leave the surface of the carbon film or to rise to an insufficiently deep cutting depth, producing gaps and unevenness in the cutting of the helix, thus resulting in defective resistors. It is desirable, therefore, to minimize the tendency of the saw to rebound from the core. It is also desirable to provide facilities for maintaining substantially constant the depth of cut during helixing. This will assure that the entire carbon resistance film is cut through and yet that the ceramic core is not badly scored by the saw.

Additionally, since the saw does not in practice cut at only a point, but rather has a finite length of cut in a direction along its rotating blade, it is desirable to provide apparatus of this type with facilities for tilting the saw so that its blade is parallel to the helical path to be cut into the carbon resistance film. This will result in a cleaner cut in the film.

It is an object of this invention to provide a new and improved apparatus for helixing a path in a carbon film deposited on a ceramic core, the apparatus having facilities for minimizing the tendency of a cutting saw to rebound from the ceramic core.

It is another object of this invention to provide in such apparatus a mechanism for maintaining substantially constant the depth of cut of the saw during the helixing operation.

It is also an object of the invention to provide in an apparatus of the stated type facilities for tilting a cutting saw to parallel the angle of helix to be cut.

With these and other objects in view, the invention contemplates apparatus having facilities for moving a rotating saw, mounted adjacent a mechanism for gripping and rotating a filmed core, from an initial position spaced from the core to a position intermediate the initial position and the core, preferably much closer to the core than to the initial position, for then momentarily stopping the movement of the saw toward the core, and for next moving the saw from the intermediate position, whereat it is stopped, into contact with the rotating core and then transversely along the carbon film of the core to cut a helical groove therein. Cooperating facilities are provided for applying an electromagnetic force to an arm which supports the saw, the force acting to bring the saw to a desired depth of cut and to maintain this depth substantially constant. The saw is mounted so as to permit its being tilted to parallel the desired angle of helixing.

Other objects and advantages of the invention will be apparent from the following detailed description when considered in conjunction with the accompanying drawing, wherein:

FIG. 3 is a top view of the apparatus illustrated in FIG. 2 showing the spindles for holding the resistor leads during cutting;

FIG. 4 is a side view of apparatus illustrated in FIGS. 2 and 3, showing a resistor being cut to the desired value;

FIG. 5 forms the top portion and FIG. 6 forms the bottom portion of a simplified schematic diagram of the control circuit of the invention; and FIG. 7 is a schematic diagram illustrating the operating cycle of the rotary switches RS–1 through RS–6 of the control circuit.

Figure 1:
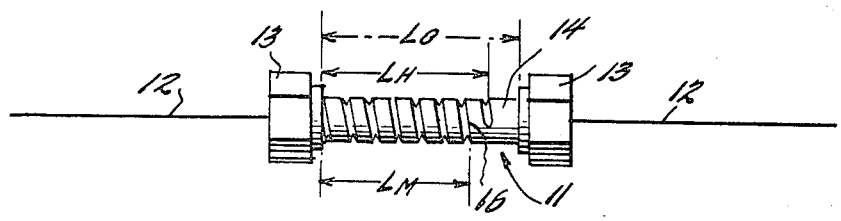
FIG. 1 is a side view of a finished resistor having a desired resistance value and having a length of cut greater than a desired minimum length.

Referring now to FIG. 1 of the drawing, there is shown a resistor 11 of generally cylindrical shape having leads 12 extending from caps 13 at either end. The resistor has a ceramic core 14 on which there has been deposited a carbon resistance film. The initial resistance of the film, prior to helixing, is less than a desired resistance value for the resistor 11. In order to raise the resistance to its desired value, a helical groove 16 is cut into the carbon film, starting near a cap 13 and running along the resistor until the desired resistance is obtained. The resistance increases with helixing due to a lengthening of the resistance path and a decrease in the cross sectional area of the carbon film through which a current can pass. The length of helix is designated as $L_H$ in FIG. 1, while the overall length of the resistance film is identified as $L_O$. It is desirable that the resistor reach its final resistance value in not less than a desired minimum length of helixing, shown in FIG. 1 as $L_M$. $L_M$ is taken to be 75 percent of $L_O$ as a useful value in practice. As $L_H$ is clearly greater in length than $L_M$ in FIG. 1, resistor 11 may be regarded as an acceptable finished resistor. Were $L_H$ to have been less than $L_M$ when the desired resistance value was reached, the resistor would have been rejected. Also, the resistor would have been rejected if it had failed to reach the desired resistance value when $L_H$ became equal to $L_O$.

Figure 2:
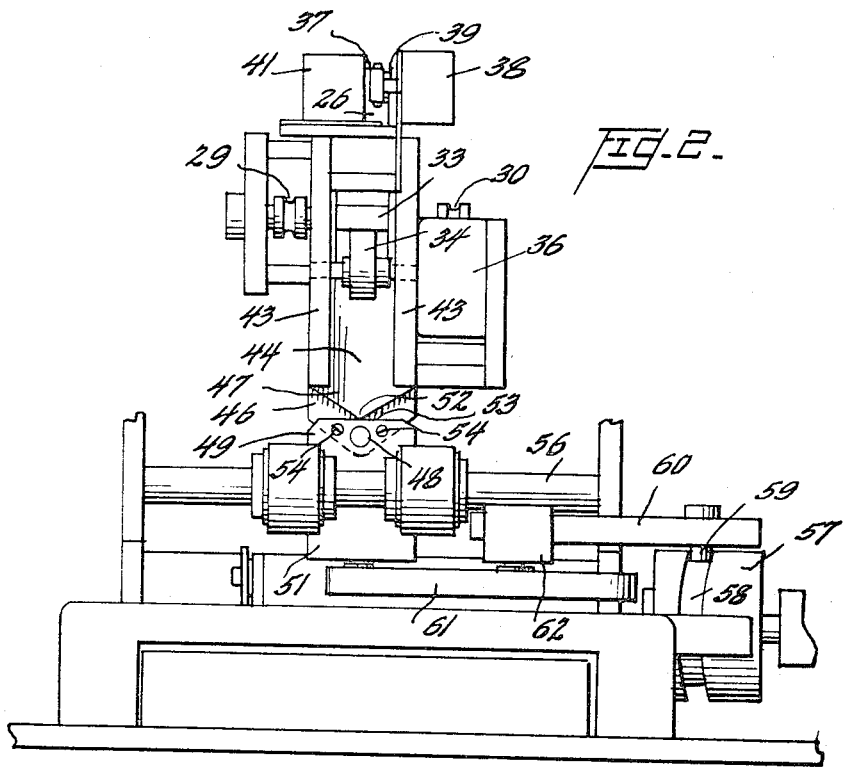
FIG. 2 is an end view of apparatus for adjusting the resistance of filmed resistors.

Turning now to FIGS. 2–4, a conventional indexing wheel 17, shown schematically in FIG. 4, which is intermittently driven by a wheel indexing step motor (not shown) has spaced about its periphery a plurality of recesses 18 for holding resistors 11. Two spindles 19 are positioned one at each side of wheel 17 and adjacent to the periphery of the wheel. The spindles are adapted to close about a resistor 11 in cutting position so that each of the leads 12 is carried by one of the spindles in an opening 21 therein and is maintained in electrically conductive contact therewith while holding the resistor electrically isolated from the cutting mechanism which is at ground potential. Spindles 19 are opened and closed by solenoid valve controlled air reciprocating rotary cylinders (not shown). The spindles are also rotated about their central axes by a spindle drive motor (not shown) in order that a helical cut may be made in the surface of a resistor 11.

A rotary saw 22 is positioned adjacent the space between spindles 19 and is mounted at one end of a pendulum arm 23 for rotation about center 25. The pendulum arm is suspended from a supporting pivot 24 near its upper end 26. Any suitable drive train, such as belts 27 and 28, pulleys 29, 30 and 31, and reduction gear mechanism 32, may be used to transmit rotary cutting power to saw 22 from a suitable motor (not shown). An arm 33 extends outwardly from pendulum arm 23, preferably perpendicularly to the pendulum arm in a direction away from index wheel 17. Preferably, arm 33 is located so that an extension of its center line would intersect the center line of pivot 24. Arm 33 is positioned to pivot pendulum arm 23 about pivot 24 to cause saw 22 to be removed from the carbon resistance film on resistor 11 when arm 33 is lifted by a cam 34 operated by a "saw up" rotary solenoid 36. Weights may be added to, or removed from, arm 33 to suitably balance the pendulum arm assembly.

Adjacent the upper end 26 of pendulum arm 23, a second cam 37 is mounted, as seen in FIGS. 2 and 3. The operation of cam 37 is controlled by a second rotary solenoid 38. Cam 37 is positioned to act upon an arm 39 extending outwardly at upper end 26 of the pendulum arm to pivot the pendulum arm about pivot 24 so that saw 22 is located off the resistance film on a resistor 11, but spaced therefrom by a relatively small distance. A spacing of 0.032 inch has been found useful in practice in apparatus having a pendulum arm 23 which extends for four inches between the supporting pivot 24 and the center 25 of saw 22. This spacing permits cam 37 to act as a temporary stop, when cam 34 is not being actuated by its rotary solenoid 36 to keep saw 22 pivoted away from a resistor 11. Thus, saw 22 may be held by cam 37 in this stopped position, close to the resistor 11, and then released by actuating rotary solenoid 38 to retract this temporary stop by withdrawing the lift portion of cam 37 from arm 39. Saw 22 may, thus, drop lightly onto the surface film of resistor 11 with a minimized tendency to rebound therefrom.

Also mounted adjacent the upper end 26 of the pendulum arm are an electromagnet 41 and a projecting stop 42. An adjusting mechanism (not shown) for adjustably positioning the projecting stop is preferably provided. Electromagnet 41 and stop 42 are so positioned that the electromagnetic force will act upon upper end 26 of pendulum arm 23 to hold saw 22 against the resistor when cams 34 and 37 are in position to permit the saw to contact the surface of resistor 11. Saw 22 is allowed to move in and out so that the saw will follow the contour of the resistor, which may have an irregularity on its surface or an elliptical core, or may be eccentric between caps 13. The depth of cut is controlled by controlling the electromagnetic force on the pendulum arm. The stop 42 may be adjusted so as to not allow the saw 22 to cut a back-up roller (not shown) when there is no resistor in place.

The pivot 24 for supporting the pendulum arm is mounted between two mounting arms 43, which also carry cams 34 and 37, solenoids 36 and 38, magnet 41 and stop 42. Mounting arms 43 are themselves carried on a mounting block 44. As seen in FIGS. 2 and 3, mounting block 44 is composed of a longer central member 46 and a pair of shorter side members 47, preferably integrally formed as a single block. A mounting block pivot pin 48 passes through longer central member 46 at a point below the lower ends of shorter side members 47. The mounting block pivot pin is carried by a pair of upward projecting portions 49 extending from a saw mounting assembly supporting member 51. The bottom surfaces of mounting block side members 47 end in a pair of pivot points 52 which are adapted to pivot on the top surfaces 53 of the supporting member upward projecting portions 49 as mounting block 44 pivots on mounting block pivot pin 48. This mounting arrangement permits the tilting of mounting arms 43 and the entire assembly carried by these arms about the axis of pin 48 to tilt pendulum arm 23 and saw 22 to parallel the desired angle of helix on resistor 11. This assembly is maintained in the selected tilted position by tightening locking screws 54 in projecting portions 49 against mounting block central member 46.

Saw mounting assembly supporting member 51 is mounted for reciprocation parallel to resistor 11 on a pair of horizontal members 56. A suitable saw carriage reciprocating motor (not shown) rotates a traverse cam 57 having a goove 58 therein for causing transverse reciprocation of the saw mounting assembly necessary for helixing. A follower 59 rides in groove 58. The follower is interconnected with saw mounting assembly supporting member 51 through any suitable reciprocating linkage, such as links 60 and 61, adjustably connected together at 62.

Positioned beneath spindles 19 are a pair of receptacles 63 and 64 (FIG. 4). Rejected resistor receptacle 63 accepts those resistors which are considered "bad," because their initial resistances are too high, because they have reached the desired resistance value before being helixed across 75 percent of their lengths, or because they have not reached the desired resistance value when helixed the entire length. "Good" resistor receptacle 64 accepts finished resistors having the desired resistance value and helixed across at least 75 percent of their lengths. A "segregating gate" 66, suitably pivoted at 67, is normally held by a rotary solenoid 68 in the "bad" resistor position shown as the clockwise position in FIG. 4, closing off "good" resistor receptacle 64 to "bad" resistors and permitting these resistors to enter "bad" resistor receptacle 63. A suitable biasing mechanism, such as one or more springs (not shown), is positioned to drop segregating gate 66 in a counter-clockwise direction to a "good" resistor position, when rotary solenoid 68 is not energized. In this position, "bad" resistor receptacle 63 is blocked and "good" resistor receptacle 64 is open to accept "good" resistors.

In describing the operation of the apparatus, reference is now made also to FIGS. 5–7. FIG. 7 is a chart which depicts the cycle of operation of six cam actuated switches, shown in the circuit of FIGS. 5 and 6 and designated as RS–1 through RS–6. The degree markings represent the attitude of the six associated cams, designated C–1 through C–6, respectively, in FIGS. 5 and 6, which are mounted on a common shaft and driven by conventional means, such as the saw carriage motor, designated by numeral 76 in FIG. 5, which operates traverse cam 57. At the cam position labeled 0°, for example, switch RS–1 is shown to be in its "up" position, switches RS–2 and RS–3 to be in their "down" positions, RS–4 and RS–5 to be closed, and RS–6 to be open.

In the operation of the apparatus, a main switch 71 and then an "on" switch 72 are first closed. Single phase alternating current is, thus, introduced to a transformer 73 and current passes through closed switch 72 to energize a main relay 74. Relay 74 closes contacts at 74–1, 74–2, 74–3, 74–4 and 74–5. The closing of the first three of these contacts provides power to the carriage drive motor 76, for rotating cam 57 to reciprocate the saw carriage, and to a spindle drive motor 77, for rotating the spindles. The closing of the contacts at 74—4 permits current to continue to flow to main relay 74 after the release of "on" switch 72, while the closing of contacts 74–5 provides power across a bus 78 and a bus 79.

A start cycle switch 81 is next actuated to provide current to a cycle control relay 82, causing the closing of contacts at 82–1 and 82–2. The closing of contacts 82–1 permits current to continue to flow to relay 82 after switch 81 is released. The closing of contacts 82–2 provides a power across a bus 83 and bus 79.

When power is supplied across bus 83 and bus 79, a saw motor 87 for supplying power to rotary saw 22 is energized. Electromagnet 41 for maintaining the saw cutting depth substantially constant is also energized. An autotransformer "A" allows easy control of magnetic flux in the electromagnet 41 to regulate the depth of the saw cut.

The cams C–1 through C–6 are now in the vicinity of the zero degree position of FIG. 7, i.e. they are positioned between 315° and 15°. Thus, "open spindles" switch RS–3 is presently in its down position. Current, therefore, flows to a latch relay 91. Relay 91 closes contacts at 91–1, 91–2 and 91–3. Contacts 91–1 are in a line to the unlatch mechanism of latch relay 91, while contacts 91–2 are in a line for energizing wheel index motor 92 and contacts 91–3 are in a line for supplying current to an "open spindles" solenoid valve 93.

A "spindles open" limit switch LS–1 of conventional type is positioned in the apparatus to be closed when spindles 19 are open. Since the spindles are now open, switch LS–1 is closed and current flows to a "spindles open" relay 94 which opens a pair of contacts 94–1, while closing contacts 94–2. The opening of contacts 94–1 creates an open circuit in the line to "open spindles" solenoid valve 93. Meanwhile, the closing of contacts 94–2 energizes wheel index motor 92 since contacts 91–2 have been closed and a pair of normally closed contacts 96–1 are presently closed. Wheel 17, thus, begins to index a resistor 11 toward its proper position adjacent spindles 19.

The start of the indexing movment causes an appropriately positioned conventional limit switch LS–2 to go from its up position in FIG. 6 to a down position. Current, therefore, flows to a latch relay 96. Relay 96 closes contacts at 96–2 and 96–3 and opens normally closed contacts at 96–1, 96–4 and 96–5. In spite of the opening of the above-described normally closed contacts 96–1, wheel index motor energization continues through LS–2, now in the down position, and contacts 96–2, now closed. Contacts 96–3, also now closed, create a path for current to flow to "close spindles" solenoid valve 86 upon the return of limit switch LS–2 to its up position at the end of the indexing movement of wheel 17. Contacts 96–4 are now open in a line to the unlatch mechanism of latch relay 91 and contacts 96–5 are open in the line to "open spindles" solenoid valve 93.

When the indexing wheel 17 reaches a position in which resistor 11 is adjacent spindles 19, conventional limit switch LS–2 is allowed to spring back to its up position. Wheel index motor 92 is, thus, open circuited, contacts 96–1 now being in open circuit position. Indexing stops, and "close spindles" solenoid valve 86 are supplied with current to cause pressurized air to actuate the spindles operating assemblies (not shown) to close spindles 19 about leads 12 of resistor 11. Limit switch LS–1 meanwhile opens, since the spindles are no longer in "open" position and "spindles open" relay 94 is deenergized, causing contacts 94–1 to close and contacts 94–2 to open. The resistor is now properly held for helixing, while spindles 19 are electrically connected across the resistor. The resistor is also electrically isolated from the cutting mechanism.

The closing of the spindles closes a conventional limit switch LS–3 to permit current to flow to a "spindles closed" relay 84. Relay 84 opens normally closed contacts 84–1, deactivating "close spindles" solenoid valve 86, and closes contacts 84–2, allowing latching relay 96 to open contacts 96–2 and 96–3 and to return contacts 96–1, 96–4 and 96–5 to their normal closed positions. Since contacts 94–2 are open, wheel index motor 92 continues to be open circuited. The presence of a pair of open contacts 97–1 keeps the line to "open spindles" solenoid valve 93 open circuited. Relay 84 may also be used to cause engagement of a spindle clutch and disengagement of a spindle brake (not shown) to permit the rotation of resistor 11.

By this time, cams C–1 through C–6 have rotated beyond the zero degree position of FIG. 7. Therefore, "testing set testing" switch RS–5 is closed and current flows to a test set 98. This test set, of known type, operates to read the resistance of resistor 11 and to close a pair of contacts 99 if and when the resistance measured across resistor 11 is equal to or greater than a control resistance having the desired resistance value. Thus, contacts 99 will be closed if the initial resistance of resistor 11 is greater than the desired resistance value, classifying the resistor as "bad." The closing of contacts 99 passes current both to the "saw up" rotary solenoid 36, which operates the cam 34 to hold saw 22 away from resistor 11 in a noncutting position, and to a "resistor to value" relay 101, which closes a pair of contacts 101–1 to complete a current path between switch RS–5 and a helix length detector switch RS–1. A closed current path through switches RS–5, RS–1 and RS–2 and closed contacts at 101–1 and 102–2 will, thus, energize a "saw up" relay 97. The resultant closing of contacts at 97–5 will keep relay 97 energized until switch RS–2 goes up at 135°. Then switch RS–2 will be in position to continue energization of relay 97 independent of the position of switches RS–1 and RS–5. Relay 101 may also be used to cause disengagement of the above-mentioned spindle clutch and engagement of the spindle brake (not shown).

If, on the other hand, the test set 98 does not read an initial resistance for resistor 11 equal to or greater than the desired final resistance value, saw up rotary solenoid 36 will be open circuited, as contacts 99 will remain open. A second pair of contacts 97–2, in a line connected in parallel to the test set contacts 99, is in an open position at this time. Contacts 97–2 can be closed by the actuation of a "saw up" relay 97. Note that switch RS–1 is up and a "saw up" switch RS–2 is shown by the chart of FIG. 7 to be in the down position on FIG. 5 from before the 0° position is reached by the cams to well after 0°. Relay 97 is, thus, now open circuited at relay 101–1. Since both pairs of contacts 97–2 and 99 are open, saw up rotary solenoid 36 will not be actuated to lift and hold saw 22 away from resistor 11.

"Antibounce rotary solenoid" switch RS–6 is open until associated cam C–6 reaches its 15° position. Rotary solenoid 38 is, therefore, open circuited and is not energized to withdraw from the arm 39 on pendulum arm 23 the surface portion of cam 37 which acts as a temporary stop. Thus, saw 22 is suspended close to, but out of contact with the filmed surface of resistor 11.

When the cams attain the 15° position of FIG. 7, switch RS–6 closes. Since normally closed contacts 97–3 remain closed, the "saw up" relay 97 which causes their closing being open circuited, current flows to rotary solenoid 38. The stop is retracted from arm 39 and saw 22 moves the small distance to contact the resistance film on resistor 11, from which it will not rebound, and where it is also held at a constant cutting depth, due to the influence of electromagnet 41 on upper end 26 of pendulum arm 23. The electromagnetic flux is controlled by the autotransformer "A." Traverse cam 57 is designed to cooperate with cam C–6 for operating switch RS–6 so that saw 22 will contact resistor 11 in the proper longitudinal position to start the required helical cut. The continued rotation of traverse cam 57, driven by carriage drive motor 76 for reciprocating the saw carriage, while spindles drive motor 77 rotates spindles 19 and resistor 11 held therein, causes helixing to occur.

"Helix length detector" switch RS–1 is presently in its "up" position, while switch RS–5 is still closed, electrically connecting the resistor to test set 98. When the resistance of resistor 11 reaches the desired value, contacts 99 will close and the saw up rotary solenoid 36 will be energized to remove saw 22 from the surface of the resistor. "Resistor to value" relay 101, in parallel with rotary solenoid 36, will simultaneously be actuated to close contacts 101–1. If this point is reached after the 115° "down" position of helix length detector switch RS–1 and prior to the 135° "up" position of switch RS–2, current will flow through normally closed contacts 97–4 to a "good" resistor relay 102. Cams 57 and C–1 are designed to cooperate so that the 115° "down" position of switch RS–1 occurs at a point at which helixing has progressed to 75 percent of the resistor length.

"Good" resistor relay 102 is actuated if resistor 11 reaches its desired value while cutting within the 75 to 100 percent portion of its length, i.e. while switch RS–1 and switch RS–2 are both in their "down" positions between 115° and 135° on the chart of FIG. 7. Relay 102 opens normally closed contacts at 102–1 and 102–2, while closing contacts at 102–3 and 102–4. The opening of contacts 102–1 open circuits the line to rotary solenoid 68, which must be energized to hold segregating gate 66 in the clockwise "bad" resistor position of FIG. 2. Thus, gate 66 is caused to attain its "good" resistor position under the influence of the biasing mechanism (not shown). The open circuit at contacts 102–1 will continue, since contacts 102–3 are now closed. Thus, the closing of "segregating gate" switch RS–4 at the 90° point on FIG. 7 will keep "good" resistor relay operative after switch RS–1 moves to its "down" position at 115° and gate 66 will be held in its "good" resistor position.

In the case of a "bad" resistor, the resistance will reach value prior to the 115° position on FIG. 7, which corresponds to helixing to 75 percent of the resistor length, or will not reach value prior to the 135°, 100 percent helixing point. Thus, test set 98 will not signal that the desired resistance value has been reached, causing the closing of contacts 101–1, while switch RS–1 is in its "down" position and switch RS–2 is in its "down" position. Therefore, the "good" resistor relay 102 will not be energized. Instead, current will flow through the contacts of switch RS–4, closed after the 90° point on FIG. 7, and through normally closed contacts 102–1 to energize rotary solenoid 68 and maintain the segregating gate in its "bad" resistor position. The nonenergization of "good" resistor relay 102 is due to the opening of contacts 97–4 by the continued energization of relay 97 if the desired resistance value is reached initially or prior to the 75 percent helixing point, or to the failure of contacts 101–1 to close if the desired resistance value is never reached.

The cutting of a "good" resistor continues after switch RS–1 goes to its "down" position at the 75 percent point. Since testing continues, switch RS–5 remaining closed, "saw up" rotary solenoid 36 will be energized when test set contacts 99 close upon the resistor reaching its desired resistance value.

At the 135° position on the chart of FIG. 7, switch RS–2 goes to its "up" position. Thus, "saw up" relay 97 will be energized, independent of its previous condition. Relay 97 closes contacts 97–1 in the line to "open spindles" solenoid valve 93, while simultaneously closing contacts 97–2 and opening contacts 97–3, both of which tend to remove saw 22 from engagement with the resistor's surface if it is still in contact therewith. Solenoid valve 93 will not be actuated, since contacts 91–3 have opened at 90° when switch RS–3 went to its "up" position, causing the unlatching of latch relay 91 to open contacts 91–1, 91–2 and 91–3. The aformentioned normally closed contacts 97–4 are also opened, and contacts 97–4 are closed, by relay 97.

At 160°, switch RS–1 returns to its "up" position without effect, since switch RS–2 is in its "up" position. Then, at 185°, RS–3 returns to its "down" position, causing latch relay 91 to close contacts 91–1, 91–2 and 91–3. The closing of contacts 91–3 energizes solenoid valve 93 to open the spindles 19. The resistor drops out and falls into the selected receptacle 63 or 64, as determined by the attitude of segregating gate 66. Spindles open relay 94 is energized by the closing of LS–1 upon the opening of spindels 19. Relay 94 opens normally closed contacts 94–1 to deenergize "open spindles" solenoid valve 93 and closes contacts 94–2 in the line to wheel index motor 92. The opening of the spindles causes LS–3 to open, open circuiting "spindles closed" relay 84. Contacts 84–1, thus, close and 84–2 open. As associated spindle clutch (not shown) may be disengaged and an associated spindle brake (not shown) may be engaged by the open circuiting of relay 84.

Saw 22 is now free to be returned by traverse cam 57 toward the initial point of contact with a new resistor. This occurs during the final portion of the cycle of cams C–1 through C–6 depicted on FIG. 7, while RS–5, RS–6 and RS–2 are succesively returned to their initial positions for the start of a new cycle.

So long as power is supplied through main switch 71, cycling will continue until the operation of one of three stop switches 103, 104, or 105, or until a pair of normally closed contacts 89–1 are opened. Contacts 89–1 are opened upon the attainment by the conventional preset counter 89 of a selected number of counts, corresponding to one more than the maximum permissible number of rejections per given time period for continuing operation of the apparatus. Time is measured by conventional pulse generator 88, which is connected to preset counter 89 to periodically reset it to zero, to start counting for another time period. Counter 89 is actuated to add one to the number of counts each time contacts 102–4, in series with counter 89, are closed by energization of "bad" resistor relay 102.

It is to be understood that the above-described apparatus is simply illustrative of one embodiment of the invention. Alternative electrical circuits may be designed by a person ordinarily skilled in the art to carry out the principles of the invention. The apparatus may easily be adapted to a "slabbing" operation, cutting a longitudinal, nonhelical groove in the resistance film, by simply not rotating the spindles. Many other modifications may be made without departing from the invention.

What is claimed is:

1. Apparatus for helixing a path in a carbon film deposited on a ceramic core, which comprises:
   means for gripping and rotating a core;
   a rotating saw;
   means mounting said saw for movement toward and away from said core in said gripping means and for movement transverse of said core;
   means permitting the saw to move toward said core from a first position spaced from said core to a second position intermediate said first position and said core and for stopping the movement of the saw toward said core, at said second position;
   means permitting said saw to move from said second position, whereat it is stopped, into contact with said core; and
   traversing means for moving said saw transverse of said rotating core to cut a helical path in the carbon film deposited thereon.

2. Apparatus for helixing a path in a carbon film deposited on a ceramic core as defined in claim 1, which comprises:
   magnetic means, rendered effective upon the movement of said saw from said second position into contact with said core, for aiding the movement of said saw into contact with said core and for holding said saw against the core, both to prevent the saw from rebounding from the core and to maintain substantially constant the depth of cut in the carbon film.

3. Apparatus for helixing a path in a carbon film deposited on a ceramic core, which comprises:
   means for gripping and rotating said core;

a rotating saw;

means mounting said saw for movement toward and away from said rotating core in said gripping means and for movement transverse of said core;

means permitting said saw to move into contact with said core and transverse of said core to cut a helical path in the carbon film; and means, operative during operation of said saw movement means, for momentarily stopping the movement of said saw toward said core at a point adjacent said core but spaced therefrom to minimize the tendency of the saw to rebound from said core upon subsequent contact therewith.

4. Apparatus for helixing a path in a carbon film deposited on a ceramic core as defined in claim 3, which comprises:

means, rendered effective upon the operation of said momentary stopping means, for biasing said saw toward said core to cooperate with said momentary stopping means to prevent the saw from rebounding from the core.

5. Apparatus for helixing a path in a carbon film deposited on a ceramic core, which comprises:

means for gripping and rotating said core;

a centrally-mounted rotating saw;

means mounting said saw for pivotal movement toward and away from said core in said gripping means and for movement transverse of said core;

means for initially permitting pivoting of said saw toward engagement with said core;

means operable upon initially permitting pivoting for limiting said pivoting to minimize a tendency of the saw to rebound from the core after engagement therewith;

traversing means for moving said saw transverse of said rotating core along a transverse line of contact therewith to cut a helical groove at an angle of helix dependent upon the relative speeds of core rotation and saw traverse; and means mounting said saw for tilting about an axis passing through the central mount of said saw and intersecting said transverse line of contact at a right angle to selectively tilt the saw to contact said rotating core at an angle equal to said desired angle of helix.

6. An apparatus as defined in claim 5 for helixing a deposited carbon resistor wherein said mounting means includes:

a sliding support member;

an upwardly projecting mounting arm pivotally attached to said sliding support member;

means for selectively locking said arm in position to locate the saw to cut along said helix; and a pendulum arm pivotally mounted on and depending from said mounting arm for supporting said rotating saw.

7. Apparatus as defined in claim 6 for helixing a deposited carbon resistor wherein said means for limiting pivoting includes:

a cam having a surface cooperating with said pendulum arm by contacting the pendulum arm to hold the saw in a position adjacent said core but spaced therefrom;

means for rotating said cam to withdraw the cooperating surface on said cam from contact with said pendulum arm; and magnetic means, rendered effective upon withdrawal of said cooperating surface from contact with the pendulum arm, for bringing said saw into contact with said core without rebounding therefrom.

8. In an apparatus for selectively removing a portion of a carbon film deposited on a core:

means for holding and rotating a core about its longitudinal axis;

means for removing the film on said core;

means for pivotally mounting said removing means for movement in a plane transverse to said longitudinal axis and for movement in a plane parallel to said longitudinal axis;

a sliding support member for supporting said pivotal mounting means;

means for initially permitting said removing means to pivot across a first span into a first position proximate to said carbon film;

means rendered effective following said initial pivoting for further permitting said removing means to pivot across a substantially shorter second span to a second position whereat said removing means removes said carbon film;

means rendered effective upon said further pivoting of the removing means for advancing said sliding support member and removing means longitudinally of the axis of rotation of said core to cut a helix in said carbon film; and means for locking said pivotal mounting to hold said removing means in a plane running through said cut helix.

9. In an apparatus for selectively removing a portion of a carbon film deposited on a core as defined in claim 8:

said means for permitting initial pivoting of said removing means including a first cam contacting a first surface on said removing means pivotal mounting means and withdrawn therefrom to commence said initial pivoting; and said means for permitting further pivoting of said removing means including a second cam contacting a second surface on said removing means pivotal mounting means after withdrawal of said first cam from said first surface, said second cam being withdrawn from said second surface to commence said further pivoting.

10. In an apparatus for selectively removing a portion of a carbon film deposited on a core as defined in claim 9:

magnetic means, rendered effective after said initial pivoting, for aiding said further pivoting, for preventing rebound of said removing means away from said second position and for maintaining a substantially constant depth of film removal.

References Cited

UNITED STATES PATENTS

| | | | |
|---|---|---|---|
| 2,623,439 | 12/1952 | Paskell | 90—11.4 |
| 3,105,288 | 10/1963 | Johnson et al. | 29—610 |
| 3,138,065 | 6/1964 | Owens et al. | 90—11.64 |

WILLIAM W. DYER, JR., *Primary Examiner.*

G. WEIDENFELD, *Assistant Examiner.*